US005915892A

United States Patent [19]

Glimpel et al.

[11] Patent Number: 5,915,892

[45] Date of Patent: Jun. 29, 1999

[54] THREAD-CUTTING CHUCK FOR CNC MACHINE TECHNOLOGY OF RIGID TAPPING

[75] Inventors: Helmut Glimpel, Lauf; Ruediger Watzke, Speiken/Nuenkirchen, both of Germany

[73] Assignee: Emuge-Werk Richard Glimpel Fabrik fuer Praezisionswerkzeuge vormals Moschkau & Glimpel, Lauf, Germany

[21] Appl. No.: 09/097,272

[22] Filed: Jun. 15, 1998

[30] Foreign Application Priority Data

Jun. 19, 1997 [DE] Germany .......................... 197 25 950

[51] Int. Cl.[6] ....................................... B23G 1/46

[52] U.S. Cl. ....................... 408/141; 279/16; 408/239 R; 470/183; 470/198

[58] Field of Search ........................ 279/16, 17; 408/141, 408/238, 239 R, 240; 470/183, 198, 903

[56] References Cited

U.S. PATENT DOCUMENTS

| | | | |
|---|---|---|---|
| 1,083,040 | 12/1913 | Wells | 408/141 |
| 1,702,810 | 2/1929 | Buhr | 470/198 |
| 2,680,257 | 6/1954 | Haugeland | 408/141 |
| 3,174,168 | 3/1965 | Jones | 408/141 |
| 3,806,973 | 4/1974 | Hopkins | 470/198 |
| 4,080,090 | 3/1978 | Kern | 408/141 |
| 4,364,694 | 12/1982 | Miles | 408/141 |

*Primary Examiner*—Daniel W. Howell
*Attorney, Agent, or Firm*—Jordan and Hamburg LLP

[57] ABSTRACT

A thread-cutting chuck for CNC machine technology of rigid tapping, with a clamping means held in a chuck shaft, particularly a collet chuck, for the tap, an accommodating part, which is held in the chuck shaft without clearance in the direction of rotation and, in the axial direction in the tension and compression directions, has a slight axial clearance cushioned by elastomeric connections disposed between the clamping means and the shaft of the chuck.

20 Claims, 1 Drawing Sheet

A
13 11 10 8 9 7 6
15
2
4 14 13 11 12 X 8 9 7 1 3
A

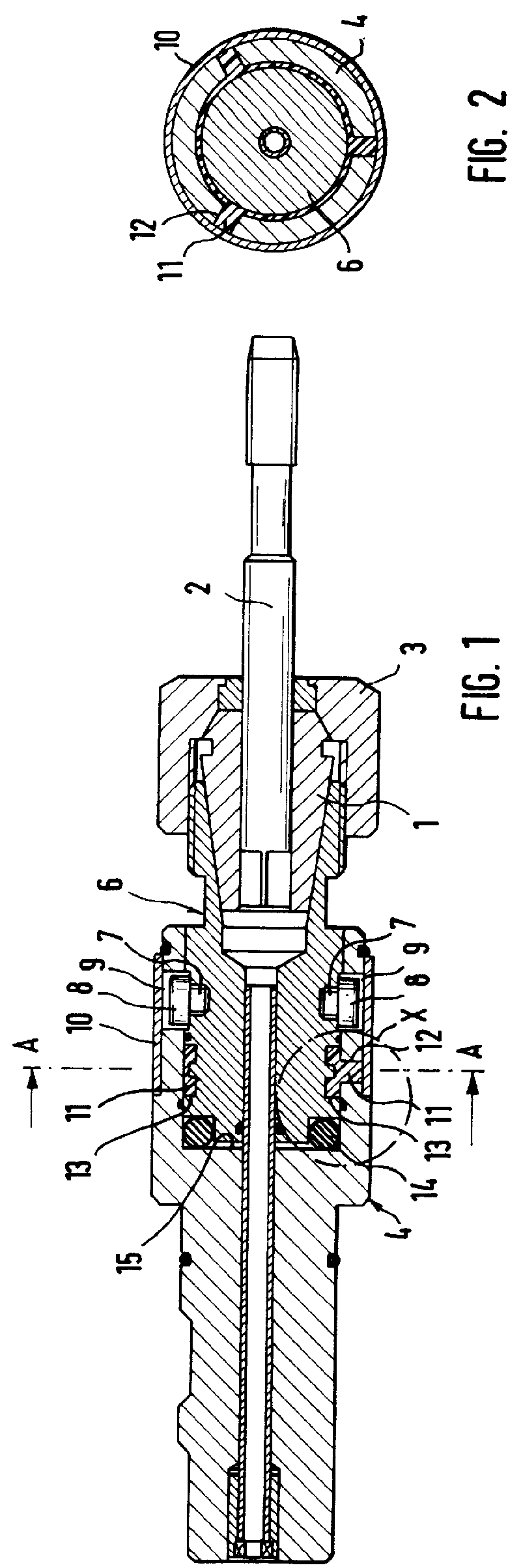
FIG. 2
FIG. 1
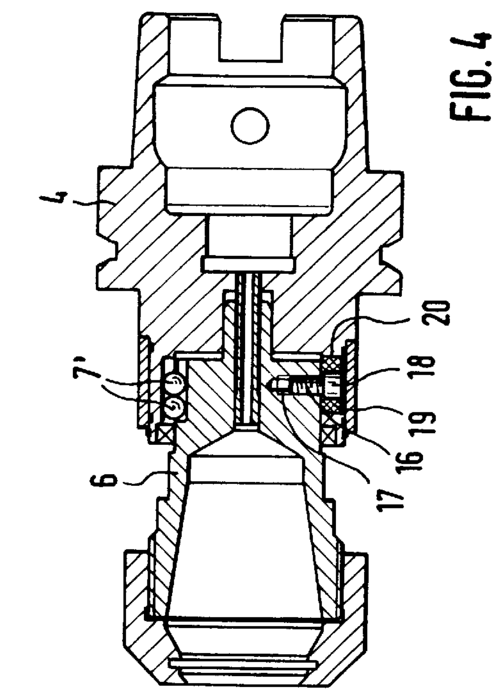
FIG. 4
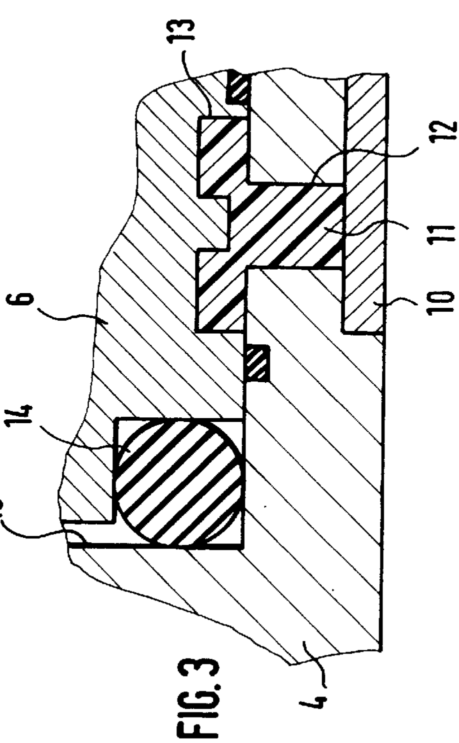
FIG. 3

THREAD-CUTTING CHUCK FOR CNC MACHINE TECHNOLOGY OF RIGID TAPPING

BACKGROUND OF THE INVENTION

The invention relates to a thread-cutting chuck for CNC (Computer Numerical Control) machine technology of rigid tapping with a clamping means held in a chuck shaft, particularly a collet chuck, for the tap.

In the case of rigid tapping, it is a question of NC machines, for which the machine manufacturer promises 100% accurate synchronization of the rotational movement of the machine spindle with the linear advancing motion as a function of the thread pitch.

Irrespective of the fact that, in the case of this process, the speed of the computer frequently limits the possible thread-cutting cycle time, experience has shown that, in the case of so-called rigid tapping, after reversal of the direction of rotation, that is, when screwing out the tap, high axial forces act on the rigidly clamped tap employed in the pulling or pressure direction without any recognizable regularity. These forces bring about an increased tool wear and decrease the surface quality of the thread that is cut.

These interfering forces addressed can be explained as follows. During the thread-cutting process, the computer of the machine control system synchronizes a linear movement of the machine with a rotational movement of the machine. Over electrical pulse generators, which are connected with the movement mechanism, the computer receives positional information regarding the respective movements. Depending on the quality of the resolution of the pulse generator, an unavoidable positional error (similar to the effect of tooth profile clearance during mechanical control) arises between the advancing unit and the workpiece spindle during the reversing of the tap. The tap, still screwed into the workpiece, becomes a tension bar or a compression bar, the forces arising increasing steeply because of the modulus of elasticity of the material of the tap.

SUMMARY OF THE INVENTION

It is therefore an object of the invention to provide a thread-cutting chuck for rigid tapping CNC machine technology which avoids or greatly reduces the aforementioned axial forces during the reversing of the tap, so that the surface quality of the cut thread is improved and there is only slight wear of the tool.

Pursuant to the invention, this objective is accomplished owing to the fact that, between the clamping means—for the sake of simplicity, only the preferred collet chuck is referred to in the following, although other clamping means, such as a quick change insert, can be used—and the shaft of the chuck, an accommodating part is disposed, which is held in the chuck shaft without clearance in the direction of rotation and, in the axial direction in the tension and compression directions, has a slight axial clearance cushioned by elastomeric connections.

For this purpose, and in a further development of the invention, provisions can be made that torque cogs, radially protruding over the accommodating part, engage boreholes of the chuck shaft, which preferably are covered by a covering sleeve, with little axial clearance.

In a further development of the invention, the slight axial movement in the tension and compression directions, provided in this manner, is cushioned by elastomeric connections filling up a borehole of the chuck shaft and expanded connecting boreholes of the accommodating part. These elastomeric connections can be produced very simply in that the elastomeric material is injected through the boreholes of the chuck shaft and then cured in the later operating position into the elastomeric connecting part.

An embodiment of an inventive cutting chuck, for which radially protruding pins, which engage the accommodating part without clearance and over which elastomeric rings, protruding into the borehole of the chuck shaft, are provided for cushioning the slight axial clearance, has proven to be particularly advantageous. This embodiment can be produced significantly more simply than the continuous spring elements, which are constructed as elastomeric connections and must be injected into the boreholes.

Moreover, this preferred embodiment of the cushioning has the advantage that the elastomeric rings can be divided transversely to the longitudinal axis of the chuck and, in each case, be constructed from materials with different elastic characteristics. By these means, a different division of forces in the tension and compression directions can be achieved, so that the axial forces referred to, when the tap is reversed, are avoided or diminished to such an extent by a slight yielding, generally only of a few tenths of a millimeter, that the surface quality of the thread that is cut is improved clearly and the tool wear also is less.

Finally, it is also within the scope of the invention that the accommodating part is supported over a rubber ring at the bottom of the chuck shaft.

Further advantages, distinguishing features and details of the invention arise out of the following description of an embodiment, as well as from the accompanying drawings.

BRIEF DESCRIPTION OF THE DRAWINGS

FIG. 1 shows a longitudinal section through an inventive thread-cutting chuck, FIG. 2 shows a section along the line A—A in FIG. 1, FIG. 3 shows an enlargement of the cutout X in FIG. 1, and FIG. 4 shows a section through a modified thread-cutting chuck, corresponding to that of FIG. 1.

DESCRIPTION OF THE PREFERRED EMBODIMENTS

Pursuant to the invention the collet chuck 1, in which the tap 2 is fastened to the chuck shaft by way of an accommodating shaft 6 and not directly with the help of the tightening nut 3. Between the chuck shaft 4 and the accommodating part 6, torque is transferred without clearance by way of the torque cogs. These torque cogs, which protrude with expanded heads 8 radially over the accommodating part, engage transverse boreholes 9 of the chuck shaft with little axial clearance. These transverse boreholes 9 are covered by a sleeve 10, which also covers the elastomeric connections 11, serving as elastic cushioning for the slight mechanical axial clearance. These elastomeric connections 11 are formed owing to the fact that a plastic elastomeric compound is injected into the boreholes 12 of the chuck shaft and the blind boreholes 13 of the accommodating part 6, expanded coaxially thereto, and then cured in the workpiece. The accommodating part 6 is supported over a rubber ring 14 at the bottom 15 of the clamping chuck 4.

Due to this construction, the thread-cutting chuck is rigid enough, so that the thread-cutting process can be regarded as rigid, as is required for rigid tapping, while the clamping of the tool, however, is elastic. Synchronization errors, which occur due to the properties and tolerances of the rotating pulse generator and the linear pulse generator of the CNC machine, accordingly do not produce any high axial forces on the tool as a function of the elastic modulus of the steel material of the thread-cutting. Instead, they produce tool axial forces only as a function of the elastic modulus of the elastomer. These forces usually produce significantly less wear in the tool.

The example of FIG. 4 differs from that of FIGS. 1 to 3 essentially owing to the fact that, instead of the torque cogs, which are constructed as pins with expanded heads, slaving spheres 7' are provided, which connect the chuck shaft 4 with the accommodating part 6 in a known manner without tolerance in the direction of rotation. However, the main difference consists in the different construction of the cushioning of the slight axial tolerance, which amounts to only a few tenths of a millimeter. In the embodiment of FIG. 4, this function is fulfilled by pins 16, which are inserted without clearance in the boreholes 17 of the accommodating part 6 and protrude radially, preferably with somewhat expanded heads 18, over the accommodating part 6. Elastomeric rings 19, consisting of rubber or a plastic, are slipped without clearance over the heads 18 and, in turn, protrude, once again without clearance, into the boreholes 20 of the chuck shaft 4. Compared to the elastomeric connection formed by injection, as shown in FIGS. 1 to 3, this type of cushioning can be produced in a much simpler manner. Moreover, this construction offers the major advantage that the elastomeric ring 19 may consist of two halves, which are divided transversely to the longitudinal direction of the chuck and consist of different materials, so that the cushioning characteristics in the tension and compression directions of the thread-cutting chuck can be configured differently.

What we claim is:

1. A thread cutting device for use with CNC machine apparatus for tapping threads using a tap comprising, a driven shaft, a chuck for holding the tap, an accommodation part between said driven shaft and said chuck, one or more holding elements between said driven shaft and said accommodating part to preclude relative rotary movement between the driven shaft and the accommodating part while permitting slight relative axial movement between the driven shaft and the accommodation part, and an elastomeric material between said driven shaft and said accommodation part cushioning relative axial movement between the driven shaft and the accommodation part.

2. A thread cutting device according to claim 1 wherein said accommodating part has an axis of rotation, said at least one or more holding element extending generally radially outwardly of said accommodation part, said at least one holding element having an outer radial end portion, said driven shaft having an opening in which said outer radial end portion is disposed.

3. A thread cutting device according to claim 2 wherein said at least one holding element includes an inner radial end portion secured to said accommodation part.

4. A thread cutting device according to claim 3 wherein said outer end portion and said inner end portion of said at least one holding element have a coextensive central axis extending generally radially of said axis of rotation of said accommodation part.

5. A thread cutting device according to claim 1 further comprising a covering sleeve mounted on said driven shaft radially outwardly of said at least one holding element, said covering sleeve covering said at least one holding element.

6. A thread cutting device according to claim 1 wherein said accommodation part includes a first receiving section receiving said elastomeric material, said driven shaft having a second receiving section receiving said elastomeric material.

7. A thread cutting device according to claim 6 wherein said driven shaft has an axis of rotation, said second receiving section including a radial passage having an axis disposed radially of said axis of rotation of said driven shaft.

8. A thread cutting device according to claim 7 wherein said accommodation part includes an outer cylindrical surface, said first receiving section extending radially inwardly of said cylindrical surface.

9. A thread cutting device according to claim 6 wherein said elastomeric material includes an inner ring part disposed in said first receiving section or said accommodation part, said elastomeric material including an outer radial part disposed in said second receiving section or said driven shaft, said outer radial part of said elastomeric material extending radially outwardly of said inner ring part of said elastomeric materia.

10. A thread cutting device according to claim 9 wherein said inner ring part of said elastomeric material circumscribing said accommodation part.

11. A thread cutting device according to claim 1 wherein said driven shaft has a generally inner cylinder section, said accommodation part having a generally outer cylindrical section disposed in said generally inner cylindrical section of said driven shaft, said inner cylindrical section having a longitudinal end, said outer cylindrical section having a longitudinal end surface, and a resilient ring between said longitudinal end of said inner cylindrical section and said longitudinal end surface of said outer cylindrical section.

12. A thread cutting device according to claim 1 wherein said at least one holding element includes a radially extending cog having an inner radially end portion secured to said accommodation part, said driven shaft having an opening, said cog having an outer radial end portion received in said opening in said driven shaft, said elastomeric material being disposed in said opening in said driven shaft radially outwardly of said outer radial end portion of said cog.

13. A thread cutting device according to claim 1 wherein said elastomeric material includes two parts, each of said two parts having different elastic properties.

14. A thread cutting device according to claim 13 wherein said accommodation shaft has an axis of rotation, said two parts of said elastic material being divided transversely to the longitudinal axis of said accommodation shaft.

15. A thread cutting device according to claim 1 wherein said driven shaft, said accommodation part and chuck have a coextensive axis of rotation.

16. A thread cutting device according to claim 1 wherein said at least one engaging element comprises a spherical element.

17. A thread cutting device for cutting threads comprising a driven shaft, a chuck adapted to hold a thread cutter, an accommodation part between said driven shaft and said chuck, one or more holding elements between said driven shaft and said accommodating part to preclude relative rotary movement between the driven shaft and the accommodating part while permitting relative axial movement between the driven shaft and the accommodation part, and an elastomeric body between said driven shaft and said accommodation part cushioning relative axial movement between the driven shaft and the accommodation part.

18. A thread cutting device for cutting threads comprising a driven shaft, a chuck adapted to hold a thread cutter, an accommodation part between said driven shaft and said chuck, said driven shaft, said chuck and said accommodation part having a common axis of rotation, holding means between said driven shaft and said accommodating part precluding relative rotary movement between the driven shaft and the accommodating part while permitting slight relative axial movement between the driven shaft and the accommodation part, and an elastomeric means between said driven shaft and said accommodation part cushioning relative axial movement between the driven shaft and the accommodation part.

19. A thread cutting device according to claim 18 wherein said holding means is axially spaced from said elastomeric means.

20. A thread cutting device according to claim 18 wherein said accommodation part has outer cylindrical portion, a circumscribing groove in said outer cylindrical portion, said elastomeric means including a ring section disposed in said circumscribing groove.

* * * * *